United States Patent

[11] 3,536,050

| [72] | Inventor | Louis Daniel Henri Denis<br>Paris, France |
|---|---|---|
| [21] | Appl. No. | 779,009 |
| [22] | Filed | Nov. 26, 1968 |
| [45] | Patented | Oct. 27, 1970 |
| [73] | Assignee | Societe d'Etudes de Machines Thermiques<br>Saint-Denis (Seine-Saint-Denis), France<br>a company of France |
| [32] | Priority | Nov. 28, 1967 |
| [33] |  | France |
| [31] |  | 129,898 |

[54] MOTION-CONVERTING DEVICE FOR BARREL-TYPE MACHINE AND VARIOUS APPLICATIONS THEREOF
25 Claims, 8 Drawing Figs.

[52] U.S. Cl. .................................................. 123/58,
74/60, 72/70, 184/6
[51] Int. Cl. .................................................... F02b 75/26,
F16h 33/10
[50] Field of Search .......................................... 123/58,
58(A)1, 58(A)2, 43, 58, 58(B)1, 58(B)2, 58(B)3,
58(C), 197; 184/6 (Barrel Engines);
74/60; 92/70

[56] References Cited
UNITED STATES PATENTS

| 1,673,632 | 6/1928 | Mattson | 123/43 |
| 3,171,509 | 3/1965 | Girodin | 123/58 |

FOREIGN PATENTS

| 885,023 | 7/1953 | Germany | 123/58 |

*Primary Examiner*—Wendell E. Burns
*Attorney*—Nolte and Nolte

ABSTRACT: A machine equipped with a rotor within a stator comprising at least one cylinder the axis of which is parallel with the axis of rotation of said rotor and which contains at least one reciprocating piston connected with at least one swashplate centered on the axis of and mounted on said rotor and rotatably mounted on an oblique hub rigid with said rotor and coupled to each piston by a connecting rod pivoted endwise respectively to the piston and swashplate through a ball-and-socket joint, and means preventing each swashplate from rotating relative to the stator.

INVENTOR
LOUIS DANIEL HENRI DENIS
BY
Nolte & Nolte
ATTORNEYS

Patented Oct. 27, 1970
3,536,050
Sheet 2 of 2
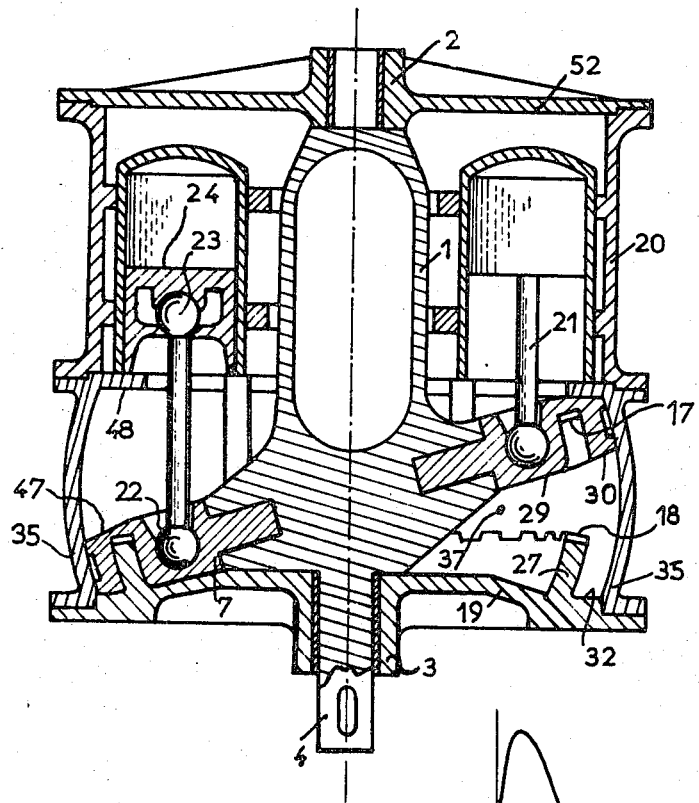
Fig. 2.
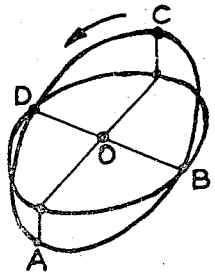
Fig. 4.
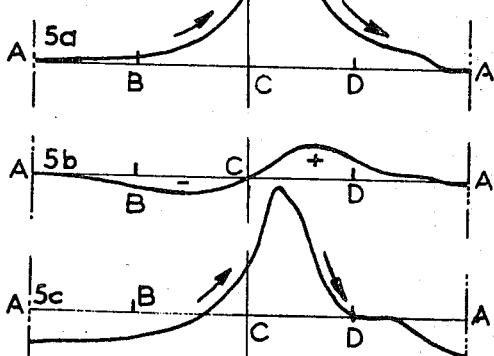
Fig. 5a
Fig. 5b
Fig. 5c
Fig. 5d
INVENTOR
LOUIS DANIEL HENRI DENIS
BY
Nolte & Nolte
ATTORNEYS

MOTION-CONVERTING DEVICE FOR BARREL-TYPE MACHINE AND VARIOUS APPLICATIONS THEREOF

The present invention relates essentially to a device for converting rectilinear reciprocating motion into rotary motion, for instance continuous rotary motion, or, alternatively, for converting rotary motion into reciprocating motion, the said device being applicable in particular to reversible barrel-type machines equipped with swashplates.

The device consists of a combination of elementary mechanisms and means for producing effects capable of damping alternate efforts, or stresses, of a hydrostatic and/or hydrodynamic type, the machines designed according to the invention offering notably the following significant features:

a reduced number of mechanical connections and members in relative motion, single or multiple connecting rod-and-piston assemblies being used;

total or partial absorption of inoperative alternate forces, that is to say forces that do not generate torque in the rotor which is designed with this end in view; and damping and/or steadying or regularization of operative torque-generating forces, or inoperative forces.

The device is applicable in particular to barrel machines of the reversible type, that is to say driving or driven machines operating for instance as motors, compressors, pumps, etc., or combinations of driving and driven machines.

The invention will be better understood and further objects, characteristics, details and advantages thereof will appear as the following explanatory description proceeds with reference to the accompanying diagrammatic drawings given by way of example only, illustrating several embodiments of the invention and wherein:

FIG. 2 is a similar view of an embodiment forming a four-cycle motor with single or multiple connecting rod-and-piston assemblies;

FIG. 4 is a perspective view showing a diagram of the pressure stresses transmitted by the connecting rods to the swashplates;

FIG. 5a is a graphical representation of the variation of pressure stresses as a function of the position denoted in FIG. 4, supposing these stresses to be uniformly distributed on the periphery of the swashplate;

FIG. 5b is a similar graphical representation, taking into account overpressure effects at the periphery of the plates and the outer adjacent chambers;

FIG. 5c is a graphical representation of the variation of the torque-generating force component, taking into account the obliquity of the connecting rods (in correlation with FIG. 5a);

FIG. 5d shows how this component is distributed when the said overpressure is applied (in correlation with FIG. 5b).

Figures 1, 3:
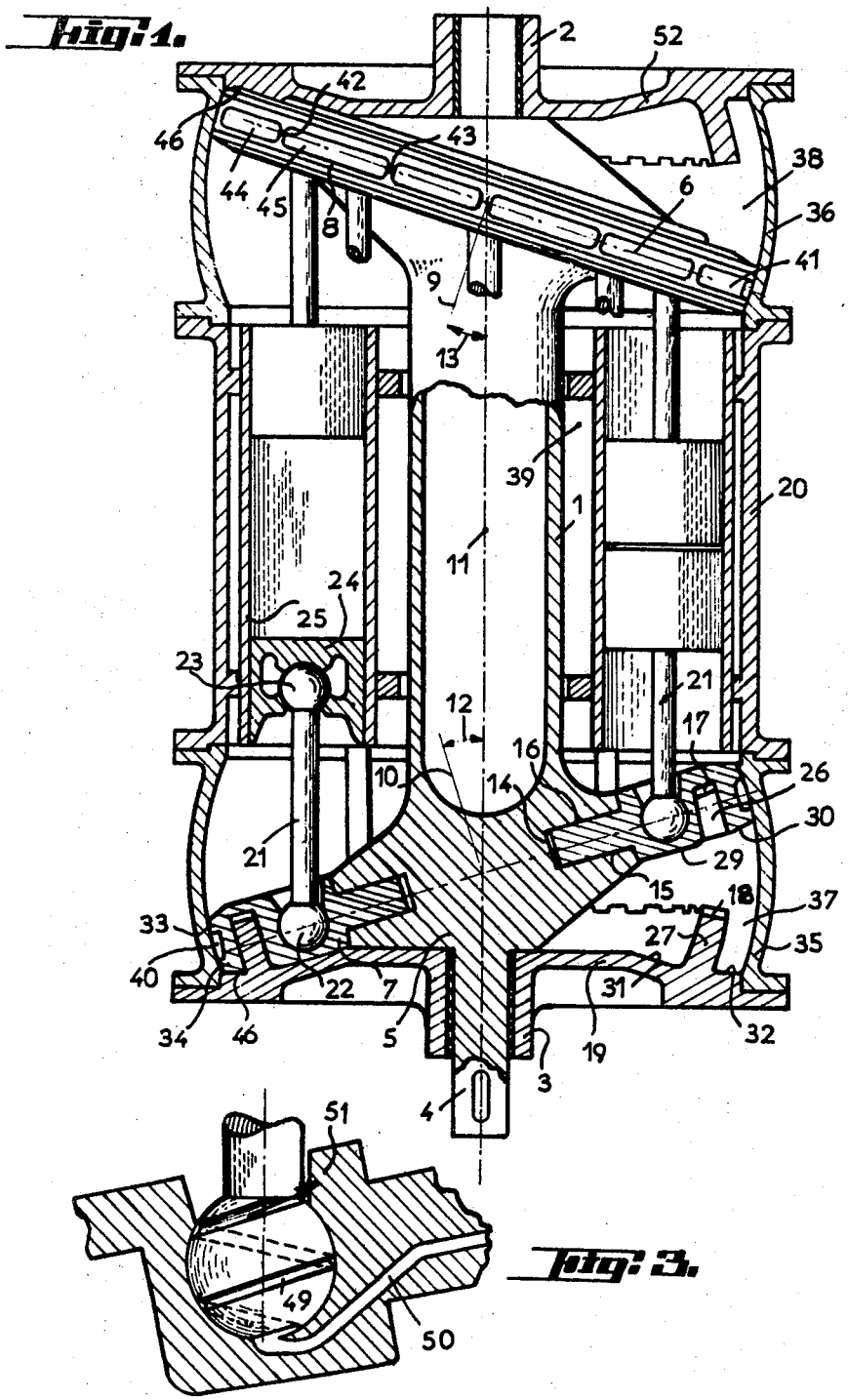
FIG. 1 is an axial view, partially in section and with parts broken away, of a two- or four-cycle opposed-piston motor with a rectilinear reciprocating motion, according to the invention.
FIG. 3 is a fragmentary detailed longitudinal section, at a larger scale, illustrating the lubrication of the ball-and-socket joint of a connecting rod.

The embodiment illustrated in FIG. 1 refers to a device according to the invention when applied to a two- or four-cycle opposed-piston motor.

The machine comprises a single one-piece or composite shaft 1 (prestressed or not) supported by two bearings 2, 3 and provided with two shaft ends 4. Shaft 1 is adapted to receive two hub-shaped members 5, 6, the shaft-and-hubs assembly thus obtained forming a one-piece or composite rotor.

The hubs are machined so as to allow a relative rotary motion of two plates 7, 8 whose axes of rotation 9, 10 lie in the plane of the axis 11 of the machine and are disposed at equal or unequal angles 12, 13 to the axis 11. Relative rotation of the hubs and plates is ensured by Mitchell- or Kingsbury-type means, or inclined groove networks, or ball, roller, needle or like arrangements, or hydrostatic- or hydrodynamic-type systems. In the embodiment illustrated, a linkage by means of centering bearings 14 and positioning abutments 15, 16, of the smooth type is shown. The inclined lubrication groove networks are not shown.

It will be understood that by the rotation of the rotor a beating or oscillating motion is imparted to the plates 7, 8, the latter being prevented from rotating during this motion by means of a connecting rod-and-piston assembly, or a tongue-and-groove arrangement, or a pair of mutually engaging toothed members, such as shown in FIG. 1, wherein a gear 17 is shown to be rigid and coaxial (axis 10) with the plate 7, whereas a gear 18 is rigid with the bottom 19 of the stator 20 and has its axis coinciding with that, 11, of the machine.

The plates are adapted to receive connecting rod-and-piston assemblies comprising connecting rods 21 pivotally assembled by means of ball-and-socket joints 22 to the plate 7 and by means of ball-and-socket joints 23 to pistons 24 reciprocating in cylinders 25.

The motion converting device thus constructed offers certain advantages which are characteristic of the invention.

In conventional machines using a crankshaft and in known machines of the barrel-type or equipped with swashplates, the forces of inertia and pressure are transmitted from the pistons to the connecting rods and to the crankpins of the crankshafts or the motion-converting device and therefrom to the bearings and the stator, while in certain types of machines the said forces are also transmitted through abutments or ball-and-socket joints.

In the machine shown in FIG. 1, the forces of inertia are transmitted to the hubs, but since these forces are mutually opposed and equal, they are absorbed by the rotor, the latter being constructed with this end in view. Thus, the rotor transmits driving torques only.

The machine illustrated in FIG. 1 comprises complementary means for increasing the efficiency of the means already described and enabling to obtain additional favorable features.

In particular, the plates 7, 8 may be provided with grooves 26 having preferably substantially spherical walls and in the bottom of which are located the gears 17, whereas the gears 18 are secured to crowns 27 having substantially spherical walls, the said crowns penetrating into the said grooves during the beating of oscillating motion of the plates, whereby motion is imparted to fluids such as air and oil. This results in a damping effect for the alternate stresses produced by the forces of inertia and pressure, this effect being adjustable by suitably determining the plays between moving parts, lubrication, etc.

The plates 7, 8 and the bottoms 19, 52 may also be designed and constructed so as to enable the bringing together and/or into contact (with a suitable play) the surfaces of, for instance, revolution 29, 30 of the plates on the one hand, and the surfaces of, for instance, revolution 31, 32 of the bottoms on the other hand, so that all or part of the stresses produced by the forces of inertia and/or pressure are transmitted directly from the plates to the bottoms of the stator, the flexibility and efficiency of this transmission or of the damping of the stresses being adjustable or adaptable through appropriate determination of the plates and lubrication of the surfaces between which relative motion is nonexistent or insignificant.

Another feature characteristic of the invention consists in providing annular or circular sealing means 33, 34 around the peripheries of the plates 7, 8 and designing the casings 35, 36 with substantially spherical inner walls so as to form tight chambers 37, 38 wherein an appropriate overpressure can be maintained with respect to the pressure at 39 within the stator. This overpressure releases the plates and hubs of part of the stresses transmitted from the connecting rod-and-piston assemblies.

Between the sealing means 33 and 34, annular intervals 40 and 41 with substantially radial partitions 42, 43, etc. are provided to form separate peripherical spaces 44, 45, etc., in which equal or unequal overpressure is produced.

In order to obtain lateral thrust or pressure, pressurized fluid is fed into the spaces 44 adjacent to the lower portions 46, from the periphery of the plates, for instance from the lower portion 46 towards the center of the plates.

Thus, the resulting thrust opposes the pressure from the pistons and connecting rods. This leads to a more spread and uniform or regular distribution of the torque-generating efforts or stresses, while at the same time reducing the stresses which do not generate torque.

Although the means described above may be used separately or in combination as set forth in the preceding description, recourse may be had to modifications thereof or to secondary means and constructional details not described. One of such modifications is shown in FIG. 2 and one constructional detail is illustrated in FIG. 3.

FIG. 2 represents a four-cycle motor with a single connecting rod-and-piston assembly composed of the same members as the motor of FIG. 1 and wherein the plate and the stator have specific outlines such that the plate 7 approaches and/or contacts the stator not only by the surfaces 29, 30 of one of its faces, but also by a surface 47 which is provided on the other face of the plate and approaches and/or contacts a surface 47 of the casing 35, the plays and lubrication being in this case adapted to suit this particular form of embodiment.

The constructional detail shown in FIG. 3 illustrates the lubrication of the ball-and-socket joints of the connecting rods through a substantially helical or spiral channel 49 fed through a channel 50 provided in the plate; the jet of oil issuing at 51 from the channel 49 is oblique and, therefore, imparts by reaction a rotary motion to the connecting rod, and this rotary motion is transmitted to the piston, thus favoring the distribution of thermal and mechanical loads of the piston and segments.

The means described above enable to obtain a novel industrial product consisting of a barrel-type machine or the like offering several advantages over known types of machines.

In particular, the creation of overpressure in the chambers 37, 38 and the space 44 results in a thrust opposing the pressure in the cylinders 25 by its action upon the plates, the direction and force of this action being adjustable by varying the overpressure at 37 and 44.

FIG. 4 is a diagram of the values of pressure stresses transmitted by the connecting rods to the plates, supposing these stresses to be uniformly distributed over the periphery of the plates. A curve 5a is thus obtained. Curve 5b is obtained when the effect of overpressure at 37 and 44 is taken into account.

Curve 5c represents the torque-generating component taking into account the obliquity or inclination of the connecting rods in a conventional machine and corresponding to the stress curve 5a. The curve 5d represents the distribution of this component in a machine provided with overpressure at 37 and 44, according to the stress curve 5b.

It will observed that the driving stresses in FIG. 5d are distributed over 70 to 80 percent of the duration of a cycle in a two-cycle motor instead of 50 percent in a conventional motor as shown by curve 5c. Similar improvement are obtained in four-cycle machines and driven machines of all types.

More generally, the device according to the invention, by making use of all or part of the means producing damping effects and alternate stress spreading effects, enables to construct reciprocating machines which are remarkable for their compactness and flexibility, as well as the steadiness or regularity of the torques developed therein.

It is to be understood that the invention should not at all be construed as being limited to the forms of embodiment shown and described, as the latter have been given by way of example only. In particular the invention comprises all the means constituting technical equivalents to the means described as well as their combinations, should they be carried out according to the spirit, principles and teachings of the invention as defined in the appended claims.

I claim:

1. In a reversible machine equipped with a rotor rotating within a stator comprising at least one cylinder the axis of which is substantially parallel with the axis of rotation of the said rotor and which contains at least one rectilinearly reciprocating piston connected with at least one swashplate centered on the axis of and mounted on the said rotor, each swashplate being mounted in relatively rotating ralationship on an oblique hub rigid with the said rotor and being coupled to each piston by a connecting rod the opposite ends of which are connected respectively with the piston and the swashplate through the medium of a ball-and-socket joint, means being provided for preventing each swashplate from rotating with respect to the stator, each said swashplate forming a bi-laterally shouldered annular disk with a substantially circular radially inner edge, rotatably mounted in a peripherical groove of the associated hub and provided with a flat bottom and substantially plane and parallel opposed walls forming a centering bearing and smooth positioning abutments, respectively, whereas the said means for preventing each swashplate from rotating with respect to the stator consists of a pair of mutually engageable associated annular toothed members respectively rigid with the said swashplate and the said stator while being at the same time respectively coaxial with the said swashplate and the axis of rotation of the said rotor, the improvement consisting in that said machine includes means for damping alternate forces which do not generate torque.

2. A machine according to claim 1, wherein the said damping means consist respectively of a groove and a crown respectively in the shape of associated spherical rings, and said crown being adapted to penetrate into the said groove with a slide fit and the said crown and groove being respectively rigid with the two elements constituted by either of the said swashplate and stator.

3. A machine according to claim 2, wherein the said toothed members are respectively rigid with the bottom of the said groove and the corresponding end edge of the said crown.

4. A machine according to claim 3, wherein the mutually confronting faces of each swashplate and of the adjacent bottom of the stator are constituted by associated surfaces of revolution about the axis of the said swashplate and the axis of the said rotor respectively, the surface of revolution of the said swashplate being adapted to periodically approach the other surface to provide a damping and transmitting action for the alternate forces through pressure of interposed lubricant.

5. A machine according to claim 4, wherein the said stator comprises at least one transverse partition wall facing the opposed adjacent face of each said swashplate, the two mutually confronting faces being constituted by associated surfaces of revolution about the axis of rotation of the said rotor and the axis of the said swashplate respectively, and the surface of revolution of the swashplate being adapted to periodically approach the other surface.

6. A machine according to claim 4, wherein the periphery of each said swashplate sealingly and slidingly engages an associated spherical annular lateral wall of the stator to define with the adjacent bottom of the said stator a tight chamber in which overpressure can be applied with respect to the stator inner space located on the other side of each swashplate.

7. A machine according to claim 6, wherein each said swashplate is provided with two spaced annular sealing members disposed along the periphery thereof to sealingly and slidingly engage the said adjacent wall of the stator, and a peripherical annular groove extending between the said sealing members and subdivided by radial partitions into separate peripherical spaces, at least the spaces closest to the adjacent bottom of the said stator being adapted to be fed with compressed fluid.

8. A machine according to claim 7, wherein each connecting rod ball is provided with at least one lubrication channel in the form of a substantially helical groove running on the surface thereof, one end of the said groove communicating with a lubricant feed conduit provided in the adjacent swashplate, and the opposite end of the said groove being substantially obliquely and tangentially oriented, so that the jet of lubricant at the outlet thereof imparts to the connecting rod, by reaction, a rotary motion which is transmitted to the piston.

9. A machine according to claim 8, comprising two spaced, inclined swashplates mounted on a common rotor and each said cylinder contains two pistons moving in opposite directions and respectively connected with the said swashplates through the medium of the said connecting rod.

10. A machine according to claim 9, wherein the said two swashplates are substantially symmetrical with respect to a transverse plane perpendicular to the axis of rotation of the common rotor.

11. A machine according to claim 9, characterized in that the axes of revolution of the said swashplates proper form respectively unequal angles to the axis of rotation of the common rotor.

12. A machine according to claim 5, wherein the periphery of each said swashplate sealingly and slidingly engages an associated spherical annular lateral wall of the stator to define with the adjacent bottom of the said stator a tight chamber in which overpressure can be applied with respect to the stator inner space located on the other side of each swashplate.

13. A machine according to claim 12, wherein each said swashplate is provided with two spaced annular sealing members disposed along the periphery thereof to sealingly and slidingly engage the said adjacent wall of the stator, and a peripherical annular groove extending between the said sealing members and subdivided by radial partitions into separate peripherical spaces, at least the spaces closest to the adjacent bottom of the said stator being adapted to be fed with compressed fluid.

14. A machine according to claim 13, wherein each connecting rod ball is provided with at least one lubrication channel in the form of a substantially helical groove running on the surface thereof, one end of the said groove communicating with a lubricant feed conduit provided in the adjacent swashplate, and the opposite end of the said groove being substantially obliquely and tangentially oriented, so that the jet of lubricant at the outlet thereof imparts to the connecting rod, by reaction, a rotary motion which is transmitted to the piston.

15. A machine according to claim 14, comprising two spaced, inclined swashplates mounted on a common rotor and each said cylinder contains two pistons moving in opposite directions and respectively connected with the said swashplates through the medium of the said connecting rod.

16. A machine according to claim 15, wherein the said two swashplates are substantially symmetrical with respect to a transverse plane perpendicular to the axis of rotation of the common rotor.

17. A machine according to claim 14, wherein the axes of revolution of the said swashplates proper form respectively unequal angles to the axis of rotation of the common rotor.

18. A machine according to claim 1, wherein the mutually confronting faces of each swashplate and of the adjacent bottom of the stator are constituted by associated surfaces of revolution about the axis of the said swashplate and the axis of the said rotor respectively, the surface of revolution of the said swashplate being adapted to periodically approach the other surface to provide a damping transmitting action for the alternate forces through pressure of interposed lubricant.

19. A machine according to claim 18, wherein the said stator comprises at least one transverse partition wall face facing the opposed adjacent face of each said swashplate, the two mutually confronting faces being constituted by associated surfaces of revolution about the axis of rotation of the said rotor and the axis of the said swashplate respectively, and the surface of revolution of the swashplate being adapted to periodically approach the other surface.

20. A machine according to claim 1, wherein the periphery of each said swashplate sealingly and slidingly engages an associated spherical annular lateral wall of the stator to define with the adjacent bottom of the said stator a tight chamber in which overpressure can be applied with respect to the stator inner space located on the other side of each swashplate.

21. A machine according to claim 20, wherein each said swashplate is provided with two spaced annular sealing members disposed along the periphery thereof to sealingly and slidingly engage the said adjacent wall of the stator, and a peripherical annular groove extending between the said sealing members and subdivided by radial partitions into separate peripherical spaces, at least the spaces closest to the adjacent bottom of the said stator being adapted to be fed with compressed fluid.

22. A machine according to claim 1, wherein each connecting rod ball is provided with at least one lubrication channel in the form of a substantially helical groove running on the surface thereof, one end of the said groove communicating with a lubricant feed conduit provided in the adjacent swashplate, and the opposite end of the said groove being substantially obliquely and tangentially oriented, so that the jet of lubricant at the outlet thereof imparts to the connecting rod, by reaction, a rotary motion which is transmitted to the piston.

23. A machine according to claim 4, comprising two spaced, inclined swashplates mounted on a common rotor and each said cylinder contains two pistons moving in opposite directions and respectively connected with the said swashplates through the medium of the said connecting rod.

24. A machine according to claim 23, wherein the said two swashplates are substantially symmetrical with respect to a transverse plane perpendicular to the axis of rotation of the common rotor.

25. A machine according to claim 23, wherein the axes of revolution of the said swashplates proper form respectively unequal angles to the axis of rotation of the common rotor.